US008553930B1

(12) United States Patent
Myers

(10) Patent No.: US 8,553,930 B1
(45) Date of Patent: *Oct. 8, 2013

(54) CROWD SOURCE CONTENT EDITING

(71) Applicant: Amazon Technologies, Inc., Reno, NV (US)

(72) Inventor: James David Myers, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/652,355

(22) Filed: Oct. 15, 2012

Related U.S. Application Data

(63) Continuation of application No. 12/748,643, filed on Mar. 29, 2010, now Pat. No. 8,290,206.

(51) Int. Cl.
*G06K 9/00* (2006.01)
*G06F 17/30* (2006.01)

(52) U.S. Cl.
USPC .......................... 382/100; 382/172; 707/803

(58) Field of Classification Search
USPC ......... 382/100, 103, 106, 112, 128, 137, 155, 382/162, 168, 172–173, 181, 209, 216, 224, 382/232, 254–260, 274–276, 305, 312, 321, 382/113; 1/1; 707/741, 3, 803; 719/329; 726/27

See application file for complete search history.

(56) References Cited

U.S. PATENT DOCUMENTS

| 7,290,285 | B2 * | 10/2007 | McCurdy et al. | 726/27 |
| 7,454,763 | B2 * | 11/2008 | Veselova et al. | 719/329 |
| 7,512,607 | B2 * | 3/2009 | Nagano et al. | 1/1 |
| 7,716,224 | B2 * | 5/2010 | Reztlaff et al. | 707/741 |
| 7,836,094 | B2 * | 11/2010 | Ornstein et al. | 707/803 |
| 8,160,324 | B2 * | 4/2012 | Fischer et al. | 382/128 |
| 2008/0243788 | A1 * | 10/2008 | Reztlaff et al. | 707/3 |

OTHER PUBLICATIONS

U.S. Appl. No. 12/748,643, filed Mar. 29, 2010, James David Meyers, "Crowd Source Content Editing", 42 pages.

* cited by examiner

*Primary Examiner* — Seyed Azarian
(74) *Attorney, Agent, or Firm* — Lee & Hayes, PLLC

(57) ABSTRACT

Crowd source editing of digital images to reduce errors in a digital images includes receiving a proposed modification to a content portion of a digital image. A determination is made as the whether the occurrence of the proposed modification to the content portions meets a modification threshold. Accordingly, the proposed modification to the content portion of the digital image is adopted when the occurrence of the specific modification meets the modification threshold.

20 Claims, 10 Drawing Sheets

CROWD SOURCE CONTENT EDITING

CROSS-REFERENCE TO RELATED APPLICATION

This patent application is a continuation application of co-pending, commonly-owned U.S. patent application Ser. No. 12/748,643 entitled "Crowd Source Content Editing" filed Mar. 29, 2010, which application is incorporated herein in its entirety by reference.

BACKGROUND

Content is increasingly being distributed in electronic form to an array of users for use on computing devices. Content may include traditional media such as books, magazines, newspapers, newsletters, manuals, guides, references, articles, reports, documents, and the like. The content may initially exist in print and/or in electronic form, and in the case of the print form, may be transformed from print to an electronic form through the use of an imaging device. Consequently, as more content is transformed from print to electronic form, more digital images of content are becoming available. However, in some instances, the transformation of content from the print form to electronic form may inadvertently introduce spelling, formatting, or typographic mistakes due to software or hardware encoding errors.

Moreover, some content providers are foregoing the traditional print form to self-publish directly in the electronic form. While these self-publishing content providers may gain the ability to quickly and inexpensively reach a broad marketplace of consumers, the content from such self-publishing content providers may lack the refinements offered by traditional print publishers. For example, the electronic content from such self-publishing content providers may lack professional editing or proofreading, and may suffer from grammatical, spelling, formatting, and/or typographical errors. As a result, consumers of distributed electronic content may experience frustration with their content usage, as well as dissatisfaction with electronic content providers or distributors that provided such electronic content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
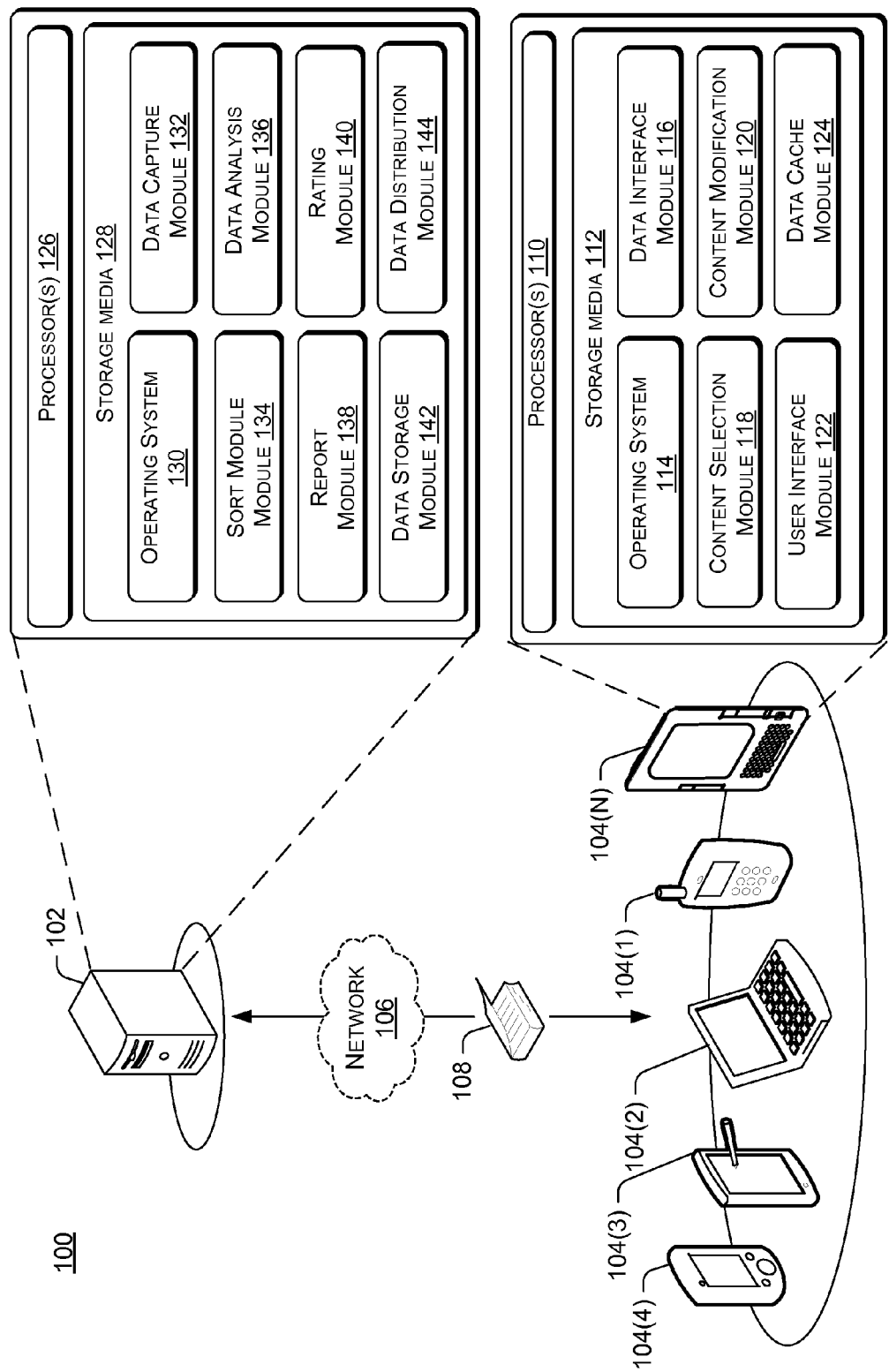
FIG. 1 shows an illustrative computing environment in which one or more embodiments of crowd source content editing may be implemented.

The disclosure is directed to techniques for crowd source content editing associated with digital images, such as digital images that are presented for viewing by electric devices. The use of crowd source content editing may leverage mass collaboration of a community of people, such as the content consumers of the digital image, to perform editing and proofreading tasks on the content of the digital image. In this way, self-publishing content providers may receive editing and proofreading services for their publicly available electronic content at little or no cost. Moreover, electronic content providers may receive corrective feedback regarding content that are transformed from printed form to electronic form, such as corrections or errors in the content that are introduced by the faults of optical recognition hardware and/or software, without expending considerable time and manpower. Furthermore, user experience with electronic content may be improved, as electronic content consumers may feel less frustration and greater satisfaction since they are able to contribute meaningfully to the refinement of electronic content, as well as mutually improve their content viewing experience.

In various embodiments, the digital image may be, but is not limit to, a page from a book, magazine, an advertisement, a newspaper, a newsletter, a manual, a guide, a reference, an article, a report, and/or any other work for visually transmitting information. A collection of digital images (digital image collection) as referred to herein may be, but is not limited to, a series of digital images corresponding to pages of a book, a magazine, an advertisement, a newspaper, a newsletter, a manual, a guide, a reference, an article, a report and/or any other work that may be represented as one or more digital images.

In some embodiments, a digital image may be created via the optical scanning and digitalization of a corresponding page of traditional content. For instance, an optical character recognition (OCR) device or other suitable techniques may be used to identify and convert recognizable text in the traditional content into a document image or selectable text (e.g., ASCII text). However, in other embodiments, a digital image may be created electronically via a word processing application, a publishing application, a graphics editing application, and/or the like.

For purposes of discussion, the crowd source content editing of a digital image may be described with respect to the manipulation of the digital image, the content contained in and represented by the digital image, or both. However, it is understood that the actual manipulation may be performed in memory with respect to the underlying data file that drives the presentation of the digital image.

As used herein, crowd source content editing refers to edits to a document by a collaborative group. For example, if a sufficient number of participants in the collaborative group indicate that there is a typographical error in a particular content portion of a digital image, then a determination may be made that the typographical error does indeed exist. Moreover, if a sufficient number of participants indicate that the typographical error is to be corrected in a certain way, then a further determination may be made that the suggested modification is likely to be a bona fide correction.

In other words, crowd source content editing may leverage the collaborative efforts and collective knowledge of a group to perform editing and proofreading of digital image content. An illustrative environment and techniques for performing crowd source content editing of digital images is described below. However, the described crowd source content editing techniques may be implemented in other environments.

Illustrative System Architecture

FIG. 1 shows an illustrative computing environment 100 in which one or more embodiments of crowd source content editing may be implemented. The computing environment 100 may include a server 102 and a plurality of electronic devices 104 that are communicatively connected by a network 106.

The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented that transmit information via memory cards, flash memory, or other portable memory devices.

The electronic devices 104 may be implemented in any number of ways. In the FIG. 1 illustration, the electronic devices include a mobile phone 104(1), a portable computer 104(2), a tablet computer 104(3), a personal digital assistant (PDA) 104(4), and an electronic book reader device (or, an "eBook reader device") 104(N). However, these are merely examples, and other electronic devices that are equipped with network communication components, data processing components, and electronic displays for displaying data may be employed.

In some embodiments, each of the electronic devices 104 may receive one or more digital images from the server 102 via the network 106. In response, each of the electronic devices 104 may display the one or more of the digital images on a corresponding electronic display. The one or more digital images may be received on each of the electronic devices 104 from the server 102 as a part of at least one digital image collection 108. The electronic display may be a liquid crystal display (LCD), organic light emitting diode (OLED) display, a plasma display, an electronic paper display (e.g., an electrophoretic display), or any other form of electronic display that is capable presenting data in color, monochrome, and/or grayscale.

The one or more digital images may be presented on an electronic display via a software application (e.g., a document viewer application) that converts the one or more digital images from a storage format into graphical display data suitable for display on the electronic display. In accordance with various embodiments, the one or more digital images may correspond to one or more traditional pages of text, fonts, images, and/or vector graphics. In accordance with one or more embodiments, the one or more digital images may be in the form of a Portable Document Format (PDF) file, a word processing document file, an image file, and the like.

In various embodiments, the digital image may be, but is not limited to, a page from a book, magazine, an advertisement, a newspaper, a newsletter, a manual, a guide, a reference, an article, a report, and/or any other work for visually transmitting information. A collection of digital images (or, a "digital image collection" as referred to herein) may be, but is not limited to, a series of digital images corresponding to pages of a book, a magazine, an advertisement, a newspaper, a newsletter, a manual, a guide, a reference, an article, a report and/or any other work that may be represented as one or more digital images.

A digital image may include reproduction of content, as well as reproduction of margins that surround the content. Content of a digital image may include one or more of letters, characters, symbols, numbers, formulas, graphics, line drawings, table borders, images, textual content, and the like, that are used to visibly present information. Margins refer to the area that surrounds the content of a digital image.

In some embodiments, a digital image may be created via the optical scanning and digitalization of a corresponding page of traditional content. For instance, an optical character recognition (OCR) device or other suitable techniques may be used to identify and convert recognizable text in the traditional content into a digital image or selectable text (e.g., ASCII text). However, in other embodiments, a digital image may be created electronically via a word processing application, a publishing application, a graphics editing application, and/or the like.

Each of the electronic devices 104 may further include user controls that enable a user to request the one or more digital images, or one or more digital image collections 108 from the server 102. User controls may include, but are not limited to, combinations of one or more of keypads, keyboards, mouse devices, touch screens, microphones, speech recognition packages, and any other suitable devices or other electronic/software selection methods. Moreover, as further described below, each of the electronic devices 104 may also include a memory cache for storing the digital image collection 108.

As shown in FIG. 1, each of the electronic devices 104, such as the eBook reader device 104(N), may include one or more processors 110 and a storage media 112. The storage media 112 may store an operating system 114, as well as other modules that facilitate crowd source content editing. The operating system 114 may include components that enable an electronic device 104 to receive and transmit data via various inputs (e.g., user controls, network interfaces, and/or memory devices), as well as process data using the one or more processors 110 to generate output. The operating system 114 may include a presentation component that presents the output (e.g., display the data on an electronic display, store the data in memory, transmit the data to another electronic device, etc.). Additionally, the operating system 114 may include other components that perform various other functions generally associated with an operating system.

The modules may include routines, programs, objects, components, and data structures that cause the electronic device 104 to perform particular tasks. Certain modules are illustrated in FIG. 1, including a data interface module 116, a content selection module 118, a content modification module 120, a user interface module 122, and a data cache module 124.

The server 102 may include one or more processors 126 and a storage media 128, which includes an operating system 130, as well as other modules. The modules may include routines, programs, objects, components, and data structures that cause the server 102 to perform particular tasks. Certain modules are shown, including a data capture module 132, a sort module 134, a data analysis module 136, a report module 138, a rating module 140, a data storage module 142, and a data distribution module 144. The modules on the server 102 may work cooperatively with the modules on each of the electronic devices 104 to facilitate crowd source content editing of electronic content. The modules will be described in more detail below with additional reference to the illustrative user interfaces shown in FIGS. 2-7. Accordingly, the crowd source content editing of electronic content, as facilitated by the various modules of the eBook reader device 104(N) and the server 102, is illustrated with respect to FIGS. 2-7.

Electronic Device Modules

Figure 2:
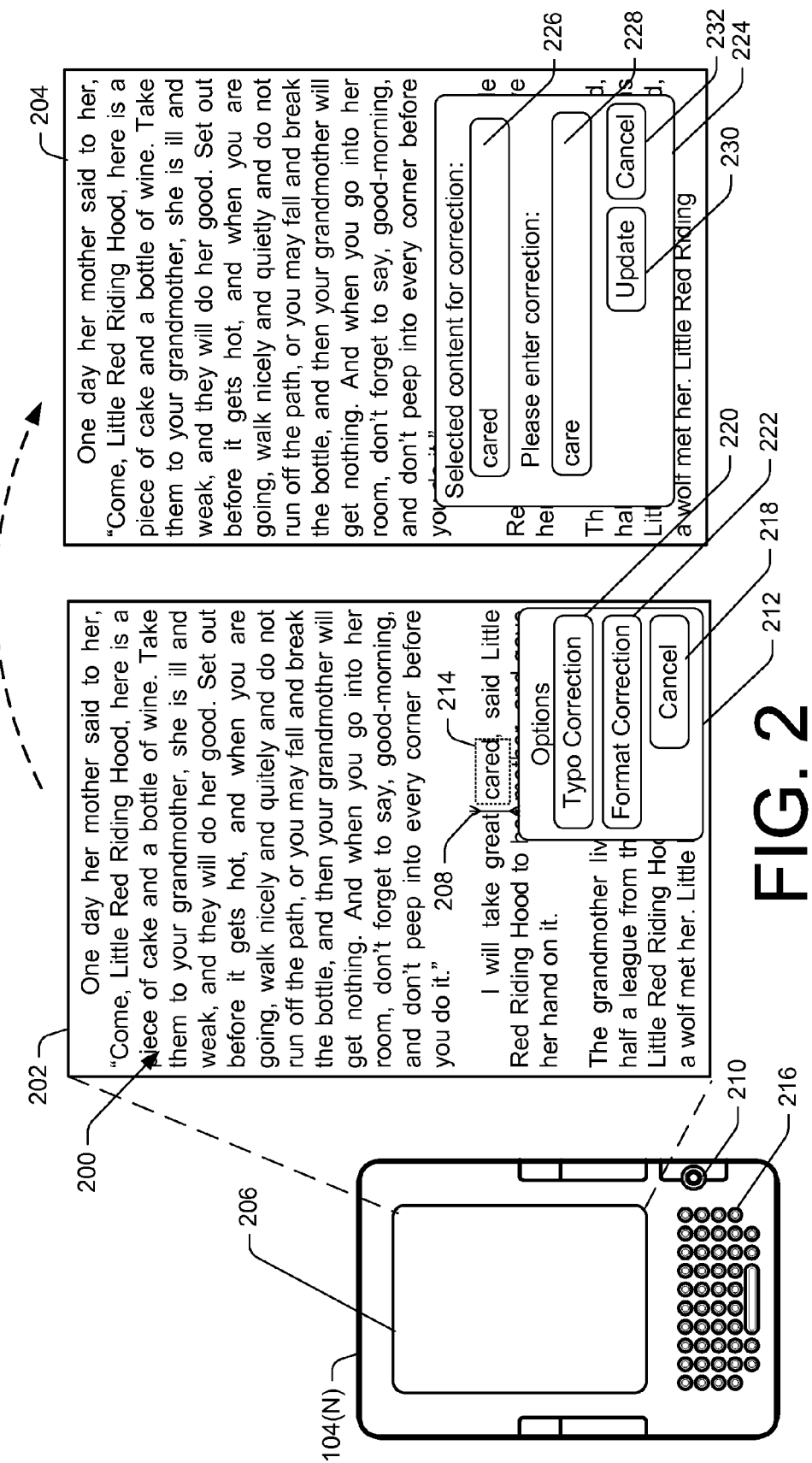
FIG. 2 shows an illustrative user interface that enables a user to provide typographical corrections to the content of a digital image for crowd source content editing.

FIG. 2 shows an illustrative user interface that enables a user to provide typographical corrections to the content of a digital image for crowd source content editing. Initially, the data interface module 116 may enable the user to request and load a digital image 200 of the digital image collection 108 from a digital image source, such as the server 102. The data interface module 116 may load the digital images from the digital image source via any wireless or wired communication interfaces, such as Universal Serial Bus (USB), Ethernet, Bluetooth®, Wi-Fi, and/or the like. As shown in screenshots 202 and 204 of FIG. 2, the digital image 200 may be displayed in its entirety in a display 206 of an electronic device 104, such as the eBook reader device 104(N).

In various embodiments, the content selection module 118 facilitates user selection of a word in the digital image shown in the screen shot 202. In at least one embodiment, the content selection module 118 may enable the user to place a cursor 208 at the beginning of the content that the user desires to select, then selecting the desired content by activating a key 210 on the electronic device 104(N) to scroll the cursor 208 to the end of content. For example, as shown in screen shot 202, the content selection module 118 may enable the user to select the word "cared" from the digital image in the screen shot 202. The content selection module 118 may show that a particular segment of content is selected via a selection indicator 214. While the selection indicator 214 is illustrated as a rectangle that surrounds the selected content, the selection indicator 214 may take different forms in various embodiments. For example, the selection indicator 214 may be in the form of underling, color change, blinking text, and/or the like.

Once the user has selected the desired content (e.g., the word "cared"), the content modification module 120 may enable the user to correct the selected content. In various embodiments, the user may activate the content modification module 120 via a key on the electronic device 104(N), such as the key 216. Upon activation, the content modification module 120 may present an option menu 212 on the display 206. The option menu 212 may include a cancel option 218, a typographical error modification option 220, and a format error modification option 222. The user may activate the cancel option 218 to dismiss the option menu 212, in which case the option menu 212 may disappear from the display 206. However, if the user desires to correct a typographical error in the selected content (e.g., a spelling error or grammar error), the user may activate the typographical error modification option 220.

As shown in the screen shot 204, the content modification module 120 may present a content modification menu 224 when the typographical error modification option 220 is activated. The content modification menu 224 may include a display portion 226 that displays the selected content. For example, the display portion 226 may display the word "cared". The content modification menu 200 may further include an input portion 228 in which the user may type a modification to the selected content. For example, the user may type the word "care" in the input portion 228.

The content modification menu 224 may further include an update option 230 and a cancel option 232. The cancel option 232 may be used by the user to dismiss the content modification menu 224. In some embodiments, activation of the update option 230 may cause the content modification module 120 to update the selected content of the digital image 200 with the modification. For example, the content modification module 120 may replace the word "cared" with the word "care". In other embodiments, activation of the update option 230 may cause the content modification module 120 to submit the modification to a data analysis module 136 that is on the server 102 via the network 106. In such embodiments, the content modification module may use the data interface module 116 to pass the modification to the data analysis module 136 of the server 102. As further described below, the data analysis module 136 may analyze the cumulative modifications received, as well as implement a particular modification when the instances of a particular modification received meets a modification threshold.

In additional embodiments, activation of the update option 230 may cause the content modification module 120 to replace the selected content with the modification, as well as submit the modification to the data analysis module 136. Thus, the behavior of the update option 230 in accordance with various embodiments may be preconfigured via a configuration menu.

Figure 3:
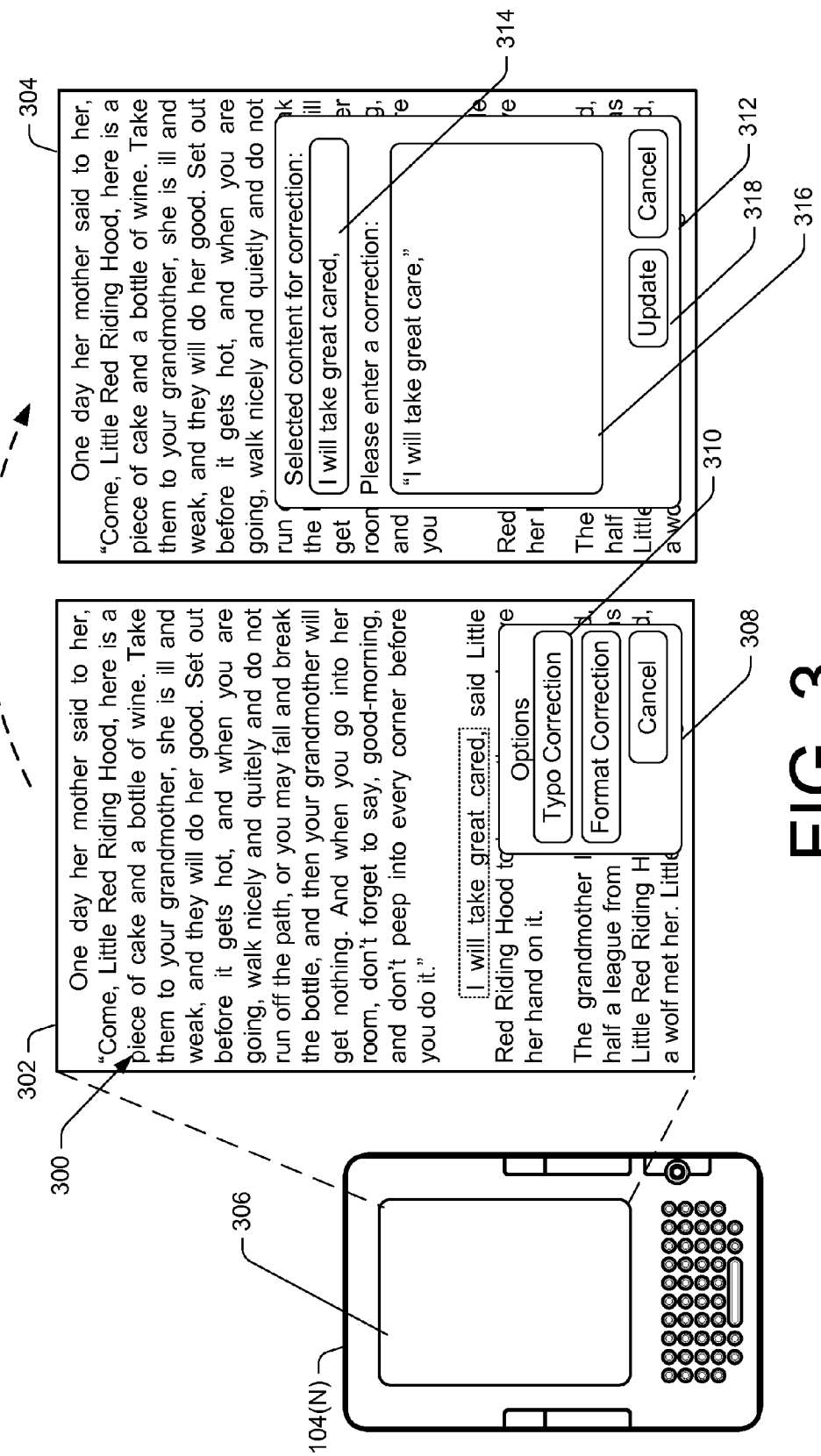
FIG. 3 shows an illustrative user interface that enables a user to select corrections to the content of a digital image for crowd source content editing.

FIG. 3 shows an illustrative user interface that enables a user to simultaneously provide multiple typographical error corrections to the content of a digital image for crowd source content editing. Initially, the data interface module 116 may enable the user to request and load a digital image 300 of the digital image collection 108 from a digital image source, such as the server 102. The data interface module 116 may load the digital images from the digital image source via any wireless or wired communication interfaces, such as Universal Serial Bus (USB), Ethernet, Bluetooth®, Wi-Fi, and/or the like. As shown in screenshots 302 and 304 of FIG. 3, the digital image 300 may be displayed in its entirety in a display 306 of an electronic device 104, such as the eBook reader device 104(N).

In various embodiments, the content selection module 118 may enable the user to select a plurality of words from the digital image 300. For example, as shown in FIG. 3, the user may select the phrase "I will take great cared," via the content selection module 118. Once the user has selected the desired content, the user may activate the content modification module 120 to present an option menu 308 on the display 306. Subsequently, the user may select a typographical error modification option 310 from the option menu 308. As shown in screen shot 304, the activation of the option 220 may cause the content modification module 120 to display a content modification menu 312. In the example shown in screen shot 304, a display portion 314 of the content modification menu 312 may display the selected content "I will take great cared,". Accordingly, in order to correct the selected content, the user may type "'I will take great care,'" in an input portion 316. In this way, the user may simultaneous correct the erroneous word "cared" to the correct form "care", as well as supply quotation marks around the phrase "I will take great care,". Subsequently, the user may use the update option 318 to implement the change to the digital image 300 and/or submit the modification the data analysis module 136 of the server 102 for analysis.

Figure 4:
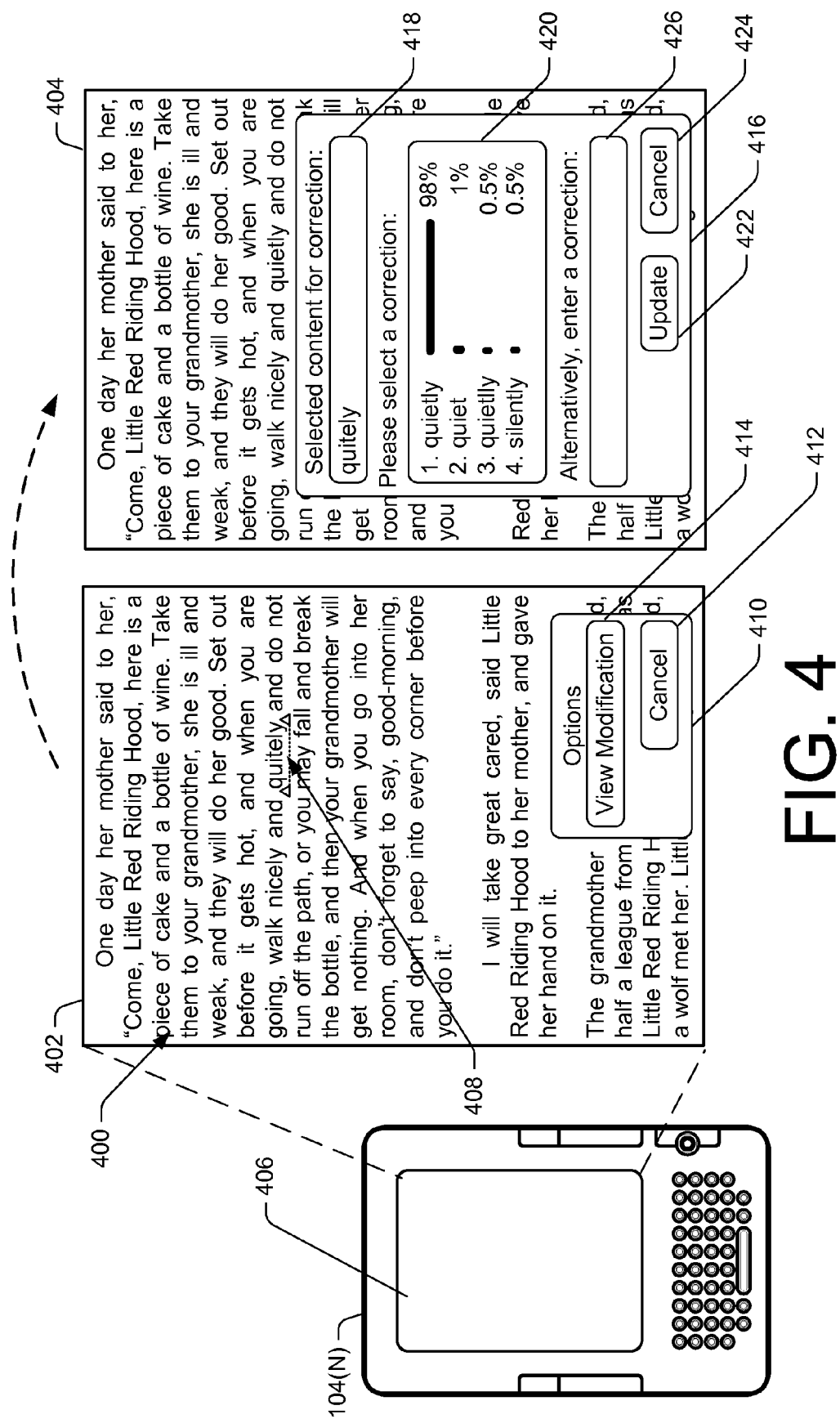
FIG. 4 shows an illustrative user interface that enables a user to select corrections to the content of a digital image for crowd source content editing.

FIG. 4 shows an illustrative user interface that enables a user to select corrections to the content of a digital image for crowd source content editing. Initially, the data interface module 116 may enable the user to request and load a digital image 400 of the digital image collection 108 from a digital image source, such as the server 102. The data interface module 116 may load the digital images from the digital image source via any wireless or wired communication interfaces, such as Universal Serial Bus (USB), Ethernet, Bluetooth®, Wi-Fi, and/or the like. As shown in screenshots 402 and 404 of FIG. 4, the digital image 400 may be displayed in its entirety in a display 406 of an electronic device 104, such as the eBook reader device 104(N). The digital image collection 108 may include embedded modification metadata that indicates proposed modifications to one or more content portions.

In various embodiments, the proposed modifications may be embedded in the digital image collection 108 by the data analysis module 136 of the server 102. For example, the data analysis module 136 may have received a plurality of identical modification proposals to a particular content portion of the digital image collection 108. In at least one embodiment, the modification proposals may be from users who have viewed the digital image collection 108 on their electronic devices 104 and submitted modifications via the user interfaces described in FIGS. 2 and 3.

Accordingly, the data analysis module 136 may embed modification metadata for the particular content portion in the digital image 400. In this way, the user of the digital image 400 may be informed that there is a likelihood that the particular content portion in the digital image 400 may be incorrect, and may be modified in the future. Thus, any frustration of the user upon noticing the error associated with the content portion may be reduced, as the user is reassured that the error is in the process of being remedied. Further, as described below, the user may have the option of viewing the embedded proposed modification metadata and contribute to the correction of the error in the content portion.

The digital image 400 may include a modification indicator 408 that indicates a content portion of the image includes embedded modification data. For example, as shown in screenshot 402, the modification indicator 408 may show that the word "quitely" in the digital image 400 is associated with embedded modification data. Accordingly, the user may select the content portion (e.g., the word "quitely") via the content selection module 118. Subsequently, by activating the content modification module 120 via a key of the device 104(N), the user may cause the content modification module 120 to present a modification option menu 410 on the display 406.

The modification option menu 410 may include a cancel option 412 and a view modification option 414. The activation of the cancel option 412 may enable a user to dismiss the modification option menu 410, that is, cause the modification option menu 410 to disappear from the display 406. In contrast, as shown in screenshot 404, the activation of the view modification option 414 may cause the content selection module 118 to present a modification selection menu 416.

The modification selection menu 416 may include a display portion 418 that displays the selected content. For example, the display portion 418 may display the incorrectly spelled word "quitely". The modification selection menu 416 may further include a modification selection portion 420, so that the content modification module 120 may retrieves the embedded metadata and display the proposed modifications to the content portion in the modification selection portion 420. For example, the modification selection portion 420 may show several different proposed modifications for the word "quitely" (e.g., "quietly", "quiet", "quietly", etc.), as suggested by various users who have previously viewed the digital image 108. Thus, the user may select the desired modification for the content portion. For instance, the user may select choice "1", or "quietly", as the spelling modification for the misspelled word "quitely".

In various embodiments, the user may select the desired modification by scrolling and/or activating a key on the electronic device 104(N). For example, the user may press a "1" number key on the device to select the first choice in the modification selection menu 416, or the word "quietly". Once the user has selected the desired modification, the user may activate the update option 422. Accordingly, depending on the configuration of the update option 422, the activation of the update option 422 may cause the content modification module 120 to change the display of the content portion (e.g., "quitely") to the appropriate modification (e.g., "quietly"), and/or cause the content modification module 120 to submit the modification to the data analysis module 136 of the server 102 via the network 106. In various embodiments, the content modification module 120 may use the data interface module 116 to pass the modification to the data analysis module 136. In contrast, the cancel option 424 may be used by the user to dismiss the modification selection menu 416.

In further embodiments, the modification selection portion 420 may also include a percentage display for each proposed modification to the content portion. Each percentage display may indicate the percentage of total submissions to the data analysis module 136 that designated a particular modification as the appropriate correction. For example, as shown in FIG. 4, 98% of the total modification submissions for the word "quitely" indicate that the word "quietly" is the appropriate correction, while the percentage of submissions received by the data analysis module 136 for each of the remaining proposed modifications is significantly less. Thus, in some instances, the percentage displays show in the modification selection menu 416 may serve to guide the user to "vote" for a particular modification.

In additional embodiments, the modification selection menu 416 may further include an input portion 426 that enables the user to type in another proposed modification to the content portion. The user may type in proposed modification if the user finds the proposed modification listed in the modification selection menu 416 unsuitable. Following the input of the modification, the user may activate the update option 422 as described above to make the modification locally to the digital image collection 108 and/or submit a particular modification to the data analysis module 136.

As further described below, the data analysis module 136 may provide modification indicators, such as the modification indicator 408, to encourage a user to participate in the crowd source content editing of the digital image collection 108. For example, the data analysis module 136 may be configured to adopt a particular modification to a content portion as a bona fide correction to the image collection 108 if the number of requests for the particular correction meets or exceeds a threshold. The content portion modification indicators may be used by the data analysis module 136 to encourage such a threshold to be met.

Figure 5:
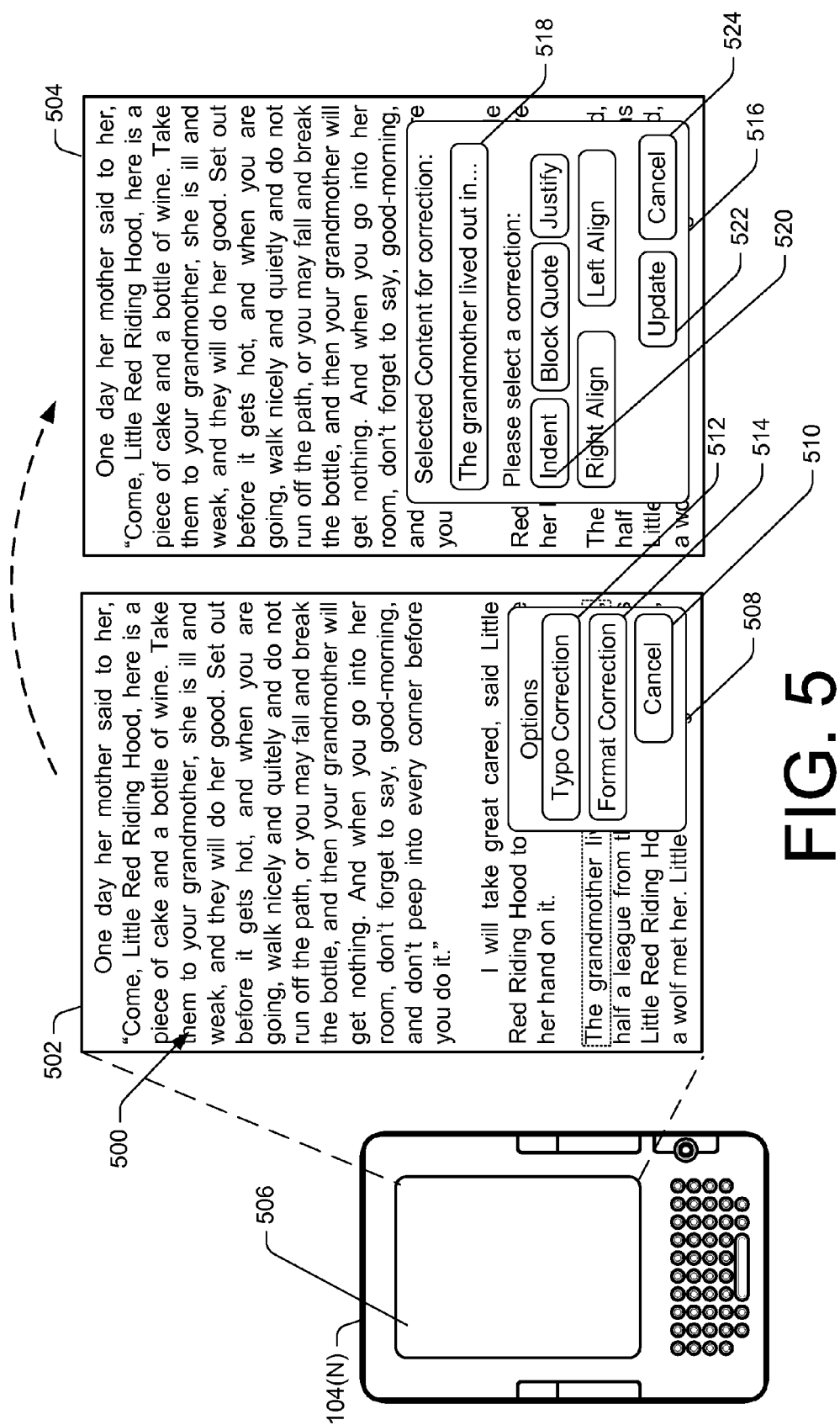
FIG. 5 shows an illustrative user interface that enables a user to provide multiple corrections to the content of a digital image for crowd source content editing.

FIG. 5 shows an illustrative user interface that enables a user to provide format corrections to the content of a digital image for crowd source content editing. Initially, the data interface module 116 may enable the user to request and load a digital image 500 of the digital image collection 108 from a digital image source, such as the server 102. The data interface module 116 may load the digital images from the digital image source via any wireless or wired communication interfaces, such as Universal Serial Bus (USB), Ethernet, Bluetooth®, Wi-Fi, and/or the like. As shown in screenshots 502 and 504 of FIG. 5, the digital image 500 may be displayed in its entirety in a display 506 of an electronic device 104, such as the eBook reader device 104(N).

In various embodiments, the content selection module 118 may enable the user to select a line of content in the digital image shown in the screen shot 502. For example, the user may select the line of content "The grandmother lived out in the woods" from the digital image 500.

Once the user has selected the desired content, the content modification module 120 may enable the user to correct the format selected content. In various embodiments, the user may activate the content modification module 120 via a key on the electronic device 104(N). Upon activation, the content modification module 120 may present an option menu 508 on the display 506. The option menu 508 may include a cancel option 510, a typographical error modification option 512, and a format error modification option 514. The user may activate the cancel option 510 to dismiss the option menu 508, in which case the option menu 508 may disappear from the display 506. However, if the user desires to correct a format error in the selected content, the user may activate the format error modification option 514.

As shown in the screen shot 504, the content modification module 120 may present a format modification menu 516 when the format error modification option 514 is activated. The format modification menu 516 may include a display portion 518 that displays the selected content. For example, the display portion 518 may display the at least a portion of the content line "the grandmother lived out in the woods." The content modification menu 200 may further include a various format modification options. For example, the options may include indent option 520 that the user may activate to indent the selected content line, "the grandmother lived out in the woods," so that the format error is corrected. Nevertheless, it will be appreciated that in various embodiments, the other format modification option may include a variety of options associated with content formatting, such as block quote, justify, right align, left align, bullet point, and/or the like.

The format modification menu 516 may further include an update option 522 and a cancel option 524. The cancel option 524 may be used by the user to dismiss the format modification menu 516. In some embodiments, activation of the update option 522 may cause the content modification module 120 to update the digital image 500 that is presented by the display 204 of the electronic device 104(N) with the modification to the selected content. For example, the content modification module 120 may indent the content line "the grandmother lived out in the woods". In other embodiments, activation of the update option 230 may cause the content modification module 120 to submit the modification to a data analysis module 136 that is on the server 102 via the network 106.

In additional embodiments, activation of the update option 522 may cause the content modification module 120 to replace the selected content with the modification, as well as submit the modification to the data analysis module 136. Thus, the behavior of the update option 522 in accordance with various embodiments may be preconfigured via a configuration menu. As further described below, the data analysis module 136 may analyze the cumulative modifications received, as well as implement a particular modification when the instances of a particular modification received meets a modification threshold.

In certain other embodiments, the content modification module 120 may also display a user interface that enables a user to select format corrections, operating in a similar to the user interface illustrated in FIG. 4. In such embodiments, the content modification module 120 may present a modification indicator for a digital image that indicates a line of content is associated with proposed format modifications. Subsequently, the user may select the line of content associated with the modification indicator to access a menu that enables the user to select the format correction that the user believes is appropriate.

In the various embodiments described in FIGS. 2-5, the content modification module 120 may track of the content modifications submitted via the update option 230 prior to providing the modification to the data analysis module 136, and reject any repeated attempts to propose the same or different modifications for the same content portion.

Figure 6:
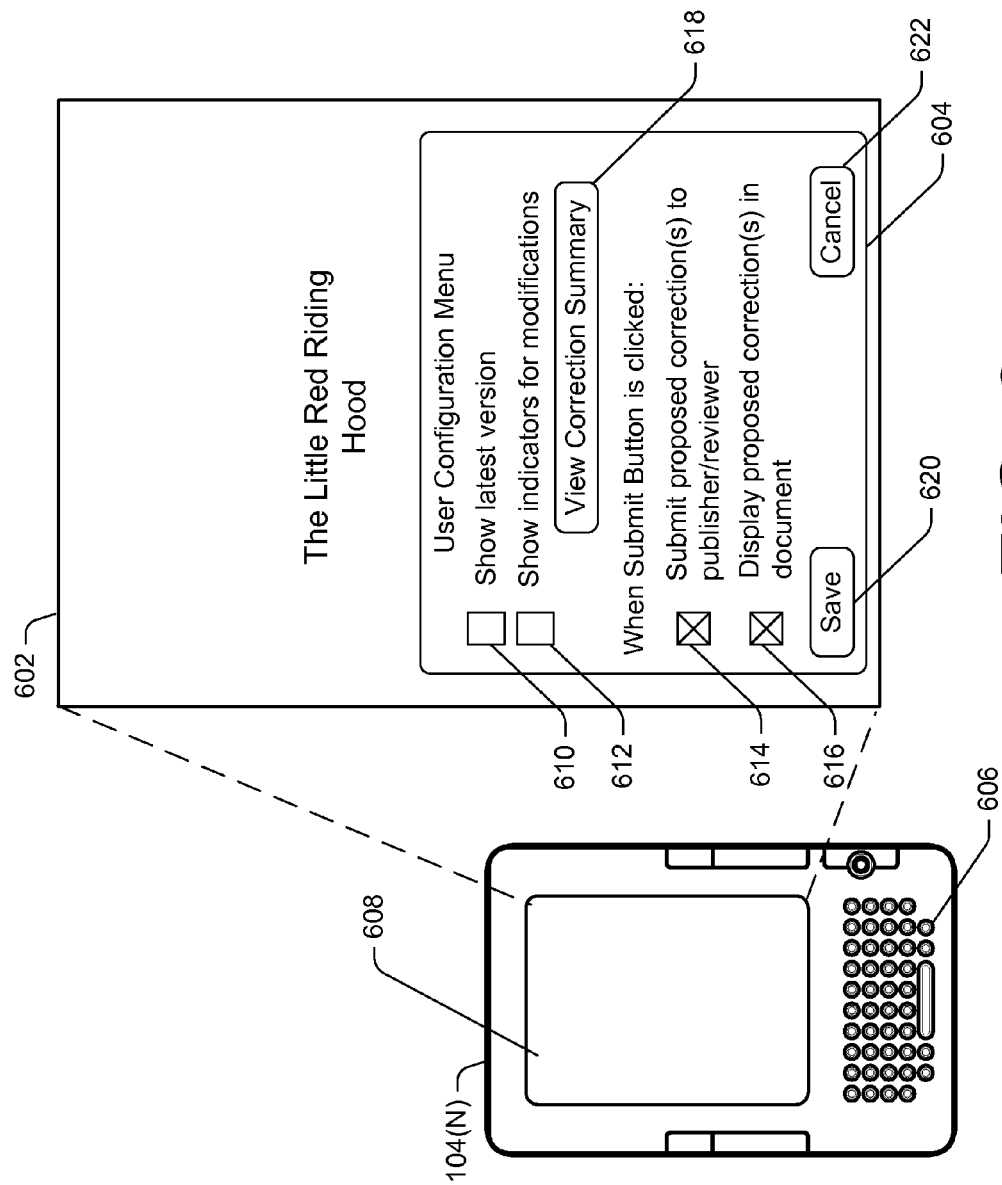
FIG. 6 shows an illustrative user interface that enables a user to set various configurations of an electronic device.

FIG. 6 shows an illustrative user interface that enables a user to set various configuration of an electronic device. The configurations may be related to the viewing of digital images on an electronic device and the submission of digital image modifications for crowd source content editing. As shown in the screenshot 602, the user interface may be in the form of a user configuration menu 604 that is presented in a display 608 of the electronic device 104(N). In various embodiments, the user may activate the user configuration menu 604 by operating a key on the electronic device 104(N), such as the key 606.

The user configuration menu 602 may include multiple checkboxes 610-616, wherein each of the checkboxes corresponds to a configuration setting. The checkbox 610 may correspond to a configuration setting that determines whether the data interface module 116 downloads an original version of a digital image collection 108, or a up-to-date version of the digital image collection 108 from the server 102 to the electronic device 104(N). The up-to-date version of the digital image collection 108 may include typographical and format corrections and/or proposed corrections that are not present in the original version. In operation, if the user desires to download the up-to-date version of the digital image collection 108, the user may check the checkbox 610.

The checkbox 612 may correspond to a configuration setting that determines whether the content modification module 120 may show modification indicators, such as the modification indicator 408 described in FIG. 4. In various embodiments, the data analysis module 136 may automatically embed modification metadata and a modification indicator for a content portion of a digital image collection 108 when a sufficient suggestion threshold is met.

For example, the data analysis module 136 may be configured to automatically modify a content portion (e.g., "quitely") in the digital image collection 108 at a modification threshold, that is, when 25% of the users who viewed the digital image collection 108 suggest the same modification (e.g., "quietly"). However, the data analysis module 136 may have a lower suggestion threshold (e.g., 15% of the users). Thus, when the lower suggestion threshold the users who viewed the digital image collection 108 suggest the same modification for a particular content portion (e.g., "quietly"), the data analysis module 136 on the server 102 may command the content modification module 120 of an electronic device 104 to display a modification indicator for the content portion. In this way, the data analysis module 136 may encourage additional user input so that crowd source content editing may be implemented more rapidly. It will be appreciated that the percentages for the modification threshold and the suggestion threshold described above are merely illustrative, and the actual thresholds may be any percentage or number in other embodiments, as long as the latter threshold is lower than the former threshold.

Nevertheless, some users may find the modification indicators disruptive to their content viewing experience. Accordingly, in operation, such users may uncheck the checkbox 612 to prevent the content modification module 120 from showing the modification indicators, if any, during their view of the document collection 108 in the display 608.

In some embodiments, a user may wish to view a summary of the corrections to the digital image collection 108 prior to making his/her decision with respect to the checkboxes 610-612. Accordingly, the user may activate a view correction summary option 618 to display a correction summary on the display 608. In at least one embodiment, the correction summary may include data such as, but not limited to: (1) the total number of corrections in the digital image collection 108; (2) each adopted modification, including the original content as well as the modified content, with location (e.g., page number, line number, position number, etc.); and/or (3) proposed modifications that are suggested for different content portions, including the original content as well as the modified content of each content portion, with location (e.g., page number, line number, position number, etc.). In this way, the user may gauge the extent of the adopted and proposed corrections to the digital image collection 108, and make an information choice with respect to checkboxes 610-612.

The user configuration menu 602 may further include checkboxes 614-616 that configures the behavior of the update options of the menus described in FIGS. 2-5, such as the update option 230. In operation, checking the checkbox 614 activates the automatic submission of corrections to the data analysis module 134 when the update option is activated, and vice versa. Likewise, checking the checkbox 616 enables the automatic display of corrections locally in the digital image collection 108 as it is being viewed by a user on an electronic device 104. In various embodiments, the content modification module 120 may be configured so that at least one of the checkboxes 614-616 is to be checked at all times.

The user configuration menu 602 may additionally include a save option 620 and a cancel option 622. Activation of the save option 620 may cause the content modification module 120 to implemented to settings selected via the user configuration menu 602. In contrast, the cancel button 622 may be used to dismiss the user configuration menu 602 without the content modification module 120 implementing the settings. It will be appreciated that while the user configuration menu 602 is illustrated as using checkboxes for configuration settings, other embodiments of the user configuration menu 602 may include the use of radio button, sliders, drop down menus, and/or the like, to achieve the same purpose.

Returning to FIG. 1, each of the electronic devices 104 may include additional modules that facilitate crowd source content editing. The user interface module 122 may receive input from various user controls of an electronic device 104. As described above, the user controls may include, but are not limited to, combinations of one or more of keypads, keyboards, mouse devices, touch screens, microphones, speech recognition packages, and any other suitable devices or other electronic/software selection methods. Further, the user interface module 122 may also provide data to the user via the display of the electronic device 104.

Accordingly, the user interface module 122, in conjunction with user controls on the electronic device 104, may enable a user to select various content portions of the digital image collection 108, as well as access and dismiss the various menus used to establish configuration settings, locally update a digital image of the digital image collection 108, and/or submit a modification to the data analysis module 136. The user interface module 122 may also facilitate the display of the various digital images of the digital collections, as well as menus generated by the other modules.

The data cache module 124 may store the various document collections, such as the digital image collection 108, which are downloaded from the server 102 for viewing the electronic device 104. The document collections stored in the data cache module 124 may include embedded metadata that includes modifications. Moreover, the data cache module 124 may also store any additional data that facilitates crowd source content editing, such as menu configuration settings, modified versions of the digital images, correction summaries for digital image collections, and/or the like.

Server Side Modules

As described above, the server 102 may include one or more processors 126 and a storage media 128, which includes an operating system 130, as well as other modules. As described above, the modules may include routines, programs, objects, components, and data structures that cause the server 102 to perform particular tasks. The modules may include a data capture module 132, a sort module 134, a data analysis module 136, a report module 138, a rating module 140, a data storage module 142, and a data distribution module 144, a data storage module 142, and a data distribution module 144.

The operating system 130 may perform various function that enables the server 102 to receive and transmit data via various inputs (e.g., user controls, network interfaces, memory devices), process the data using the one or more processors 126 to generate output, and present the output (e.g., display the data on an electronic display, store the data in memory, or transmit the data to another electronic device). Accordingly, the operating system 130 may include various program components for performing such tasks.

The data capture module 132 may receive uploaded content modifications from the electronic devices 104. The data capture module 132 may store the uploaded content modification in the data storage module 142 for processing by the other modules of the server 102.

The sort module 134 may be used by the data analysis module 136 to parse the uploaded content modifications according to (1) digital image collection; (2) position of the modified content portion in the digital image collection (e.g., specific digital image in a digital image collection, position in the digital image); and/or (3) specific modification to the particular content portion. In various embodiments, the sort module 134 may have the ability to parse out different modifications from a single modification submission. For example, in the instance where the user submitted the modification "I will take great care", as described in FIG. 3, the sort module 134 may parse out the quotation mark modification and the modification of the word "cared" to "care" as separate modifications. The sort module 134 may also keep track of the identity of each user that submitted the modifications, and/or the identity of each electronic device 104 that is used to submit the modification.

Furthermore, the sort module 134 may keep a count of the times that each specific modification to a particular content portion in a digital image collection is uploaded. In at least one embodiment, the sort module 134 may discard any repeat modification submission from the same user. In other embodiments, the sort module may discard any repeat modification submission from the same electronic device 104. In at least one embodiment, the sort module 134 save the data collected in the data storage module 142, so that the data may be used by the data analysis module 136.

The data analysis module 136 may analyze the various content modifications uploaded by users via their respective electronic devices 104. Accordingly, the data analysis module 136 may use data that is collected and parsed by the sort module 134. In some embodiments, the data analysis module 136 may determine whether a modification threshold has been reached for a specific content portion modification. Once the modification threshold is reached, the modification to the specific content portion may be automatically adopted as a permanent correction to the content portion. The correction may be further propagated to all future versions of the digital image collection that are provided for viewing by users.

In such embodiments, the modification threshold for determining whether a proposed modification to a content portion is to be adopted as a permanent correction may be implemented in a variety of ways. The modification threshold may be based on a percentage of the total users who download the digital image collection that contains the modified content portion. For example, in the instance of the modification of the word "quitely" to "quietly", as described in FIG. 2, if 25% of the users who downloaded the digital image collection 108 requested this modification via individual submissions, then the data analysis module 136 may adopt the modification as a permanent correction to the digital image collection 108.

Alternatively, the modification threshold may be based on a specific number of identical content portion modification requests from different users who downloaded the digital image collection that contains the content portion. Thus, in the instance where the word "quitely" is modified to "quietly", the data analysis module 136 may automatically adopt the modification to the content portion as a permanent correction when 100 identical modification requests for the content portion, or even when a single modification request for the content portion, is received from different users.

Moreover, in other embodiments in which the data analysis module 136 has the ability to sense whether each user has actually viewed a digital image collection on an electronic device 104, the modification threshold may be based on a specific number of identical content portion modification requests from different users who downloaded and actually viewed the digital image collection that contains the content portion.

In other embodiments, the data analysis module 136 may be configured to provide an administrator (e.g., publisher or content provider) with the ability to decide whether a content portion modification is to be made into a permanent correction when a corresponding modification threshold is reached. In other words, rather than automatically adopting the content portion modification, the data analysis module 136 may defer the decision to the administrator. Thus, as shown in FIG. 7, the data analysis module 136 may use the report module 138 to present analysis information to, and otherwise interact with, the administrator.

Figure 7:
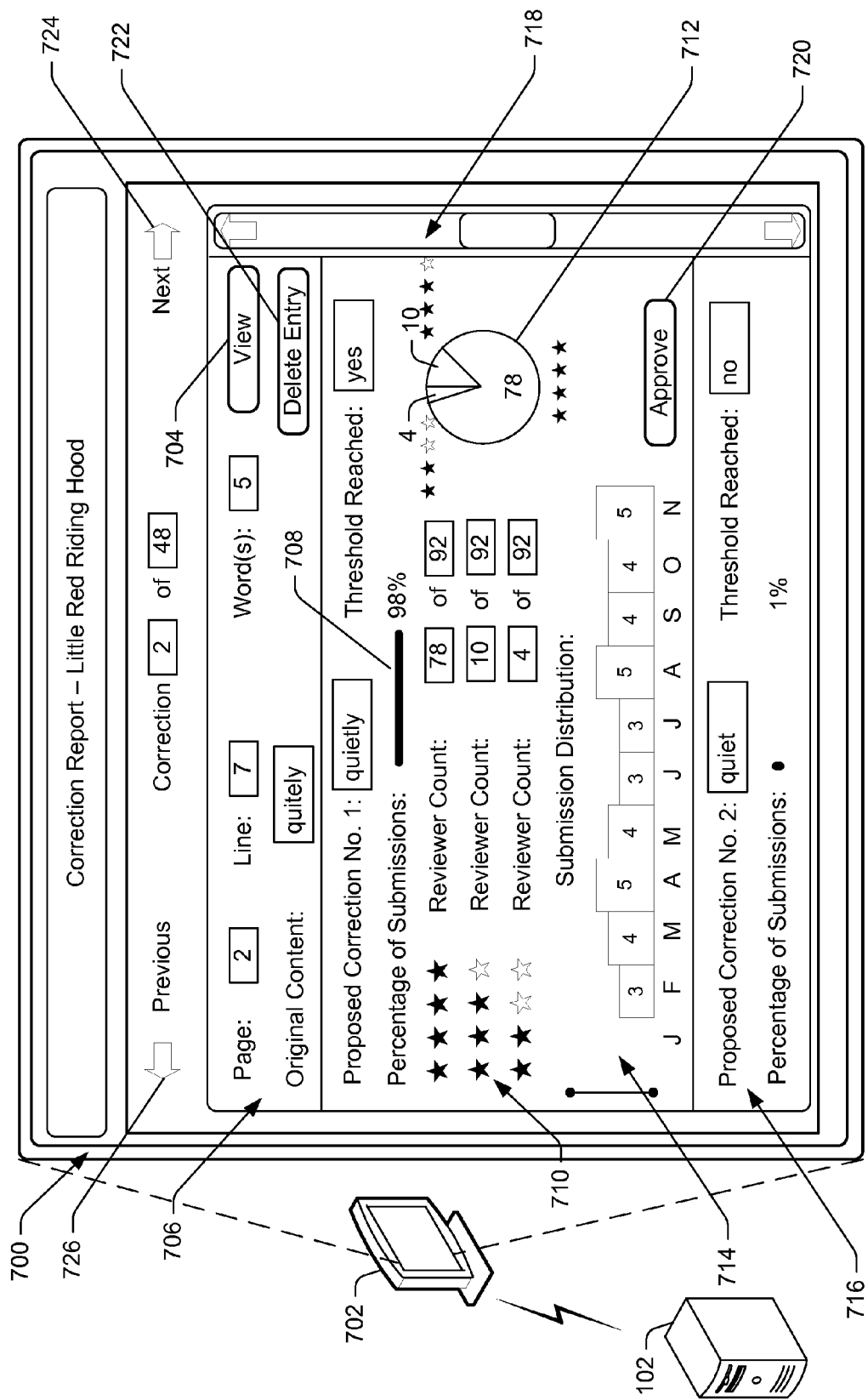
FIG. 7 shows an illustrative user interface that enables an administrator to approve crowd source edits to the content of a digital image.

FIG. 7 shows an illustrative interface page 700 that enables an administrator to approve crowd source edits to the content of a digital image. The interface page 700 may be generated by the report module 138 of the server 102 and presented on a display 702. The administrator may interact with the interface screen 700 via various user controls. The user controls may include, but are not limited to, combinations of one or more of keypads, keyboards, mouse devices, touch screens, microphones, speech recognition packages, and any other suitable devices or other electronic/software selection methods.

As shown, the report module 138 may present information regarding proposed modifications for the content portion, such as the word "quitely", as described with respect to FIG. 2, on the interface page 700. The information may include the location of the content portion in the digital image collection 108 (e.g., page number, line number, word number, etc.), The interface screen 700 may further include a view option 704 that enables the administration to view the particular digital image that includes the content portion.

Further, the interface page 700 may list data on each proposed modification to a corresponding content portion of a digital image collection 108. For example, the interface page 700 may include an entry 706 that presents data for the proposed modification "quietly". The entry 706 may include a section 708 that show a percentage of total submissions (e.g., 98%) that indicated that "quietly" is the appropriate modification for the content portion "quitely".

The entry 706 may further include a statistics portion 710 that breaks down the proposed modification "quietly" according to user credibility ratings, and as well as shows the number of users with each credibility rating that submitted the proposed modification. In various embodiments, a rating module 140 may keep track of the times that each user's proposed modifications to various digital image collections are approved by the administrator. Accordingly, the rating module 140 may further rate each user based on the usefulness of his or her contributed modifications. For example, but not as a limitation, the rating module 140 may assign 4 stars to a user whose proposed modifications are adopted by the administrator on a 75%-100% basis, and may assign 3 stars to a user whose proposed modifications are adopted by the administrator on a 50%-74% basis. Likewise, the rating module 140 may assign 2 stars to a user with 25%-49% adoption, and a one-star rating for a user with 0%-24% adoption.

In another example, the rating module 140 may assign ratings based on the number of times that a user's proposed modifications are adopted by the administrator. In such an example, the rating module 140 may assign a one-star rating for five proposed modifications that are adopted by the administrator, a 2-stars rating for 15 adopted modifications, a 3-stars rating for 50 adopted modification, and a 4-stars rating for 100 adopted modifications. In this way, the use of a rating system implemented via the rating module 140 may motivate users to strive for accuracy in their proposed modification for the sake of a higher credibility rating.

Accordingly, the administrator may rely on the statistics portion 710 to gauge the appropriateness of the modification to the content portion. For example, as shown in FIG. 7, if the proposed modification "quietly" is predominately submitted by 4-star rated users, then the administrator may deduce that the proposed modification is likely to be appropriate. Conversely, if a proposed modification is predominately submitted by one-start rated users, then the administrator may deduce that the proposed modification is questionable. In some embodiments, the statistics portion 710 may also display a graphical representation 712 (e.g., a pie chart) that illustrates the distribution of the users with different credibility ratings.

The modification submissions may further be weighted by the sort module 134 according to the ratings of the users. For example, a submission by a 4-star rated user may count as 1.5 submissions, a submission by a 3-star rated user may be counted as one submission, a submission by a 2-star rated user may count as 0.75 submission, and a submission by a 1-star rated user may count as 0.5 submission. In this way, the sort module 134 may implicitly take into account the creditability ratings of the users as the sort module 134 determines the whether a modification threshold is met for a content portion.

In alternative embodiments, the data analysis module 136 may also directly interface with the rating module 140 to modify the ratings of the users when content modifications are automatically adopted. In other words, when the data analysis module 136 automatically adopts a proposed content modification because a modification threshold for the modification is met, the rating module 140 may increase the credibility rating of a user that submitted the adopted modification (e.g., assign more stars), as the adoption percentage for such a user likely increased. Further, once a proposed modification is automatically adopted by the data analysis module 136, the remaining proposed modifications for the content portion that are not adopted may cause the rating module 140 to decrease the credibility ratings of a user that submitted one of the proposed modifications (e.g., assign less stars), as the adoption percentage for such a user likely decreased.

The entry 706 may further include a distribution representation 714 that details the chronological distribution of modification submissions. As shown, the distribution representation 714 may show the number of modification submissions on a monthly basis. However, in other embodiments, the modification submissions may also be shown at other periods (e.g., hours, daily, weekly, etc.). The distribution representation 714 may help the administrator spot trends or anomalies in the distribution of submissions. For example, a sudden spike in the number of modification submissions for a particular content portion during a short period of time (e.g., a month, a week, a day) may indicate intentional tampering with the particular content portion.

As further shown, the interface page 700 may include an entries that present statistical and user rating data for any related proposed modification to the same content portion. For example, the interface page 700 may include an entry 716 for second proposed modification "quiet" in a similar manner, and so on and forth, for each of the proposed modifications for the misspelled word "quitely" shown in FIG. 2. Thus, the interface page 700 may include a scroll bar 718 that enables the interface page 700 to present additional entries.

Thus, by using the data presented in the entries shown in the interface page 700, and/or the viewing the content portion of the digital image collection 108 via the view option 704, the administration may approval a proposed modification that is most appropriate for the content portion. For example, if the administrator desires to approval the word "quitely" as the correction for the misspelled word "quitely," the administrator may activate (e.g., click) on the approval button 720 in the entry 706. In response, the data analysis module 136 may adopt the modification as a permanent correction to the digital image. However, in an instance where administrator finds all the proposed modifications unsuitable, the administrator may delete all of the proposed modifications, as well as the corresponding content modification entry, using the delete entry button 722. Conversely, the administrator may also use an approval button of an entry (e.g., approval button 720) to approve a proposed modification even when the modification threshold of the proposed modification has not been met. For example, the administrator may choose to do so when the appropriateness of the proposed modification is immediately apparent.

Moreover, an administrator may navigation between proposed modifications for different content portions of a digital image collection 108 by using the navigation buttons 724 and 726, until proposed modifications for each content portion are reviewed.

In still other embodiments, the report module 138 may directly access the sort module 134 and make the interface page 700 available to the administrator without regards to modification thresholds. Thus, in such embodiments, the administrator may have the ability to personally approve or disregard proposed modifications to content portions without taking into account the collective input of the users.

In various embodiments, the report module 138 may make the interface page 700 available to the administrator via a client-side application. Alternatively, the report module 138 may include web interface functionalities that enable the interface page 700 to be accessible via a web browser via the network 106.

Returning to FIG. 1, the data storage module 142 may store digital images, such as digital images of the digital image collection 108, as well as modified versions of the stored digital images that include adopted corrections. The data storage module 142 may further store the various data generated by the sort module 134, the data analysis module 136, the report module 138, and the rating module 140.

The data distribution module 144 may provide one or more digital images to the electronic devices 104 in response to requests from a data interface module 116. In some embodiments, the digital images may be part of an original digital image collection 108. In other embodiments, the digital images may be part of a modified digital image collection that includes adopted corrections. Thus, the data distribution module 144 may keep track of different versions of each digital image, and provide the appropriate version based on the request of the data interface module 116.

Illustrative Operations

Figure 8:
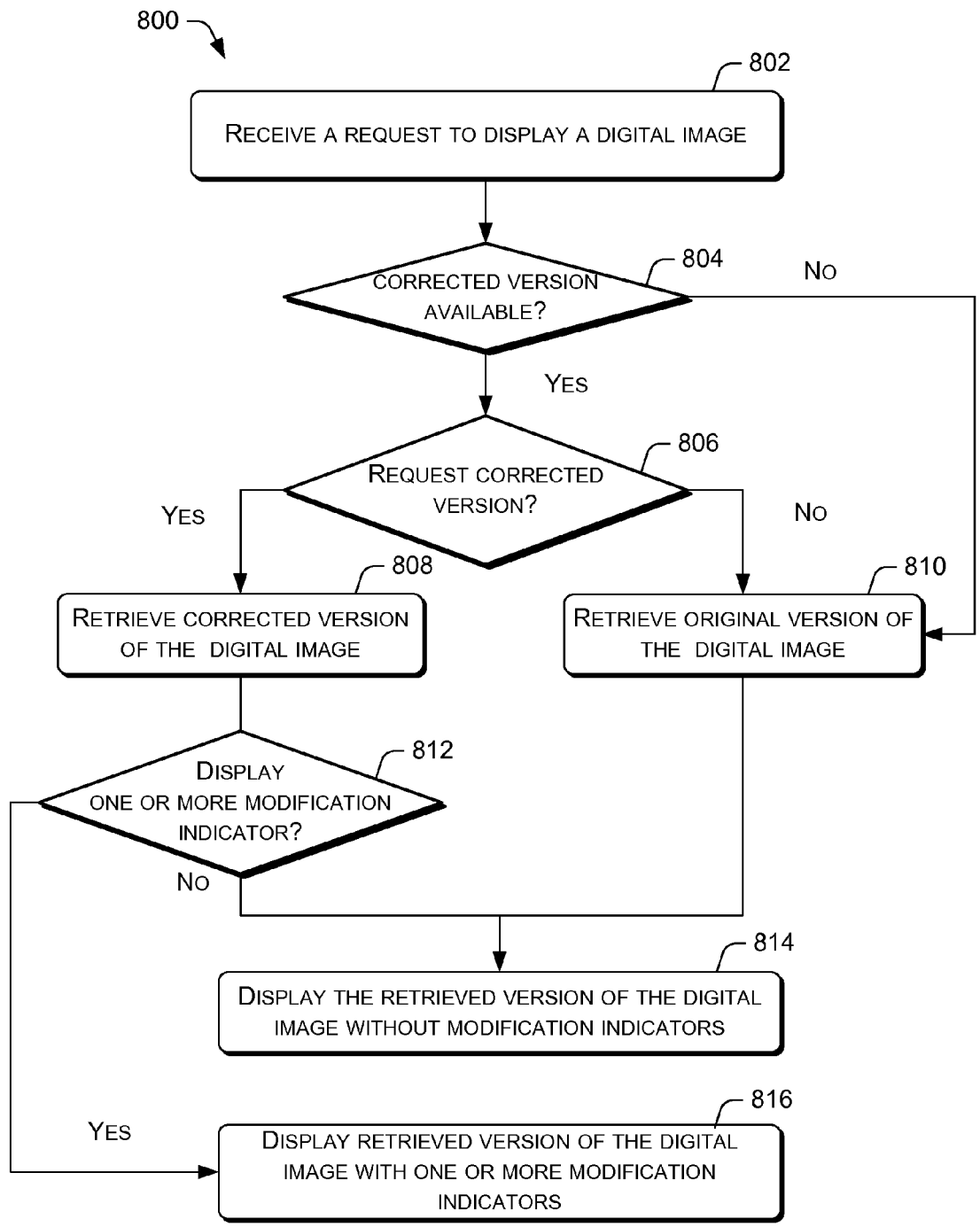
FIG. 8 is a flow diagram of an illustrative process for retrieving and displaying crowd source edited content.
Figure 9:
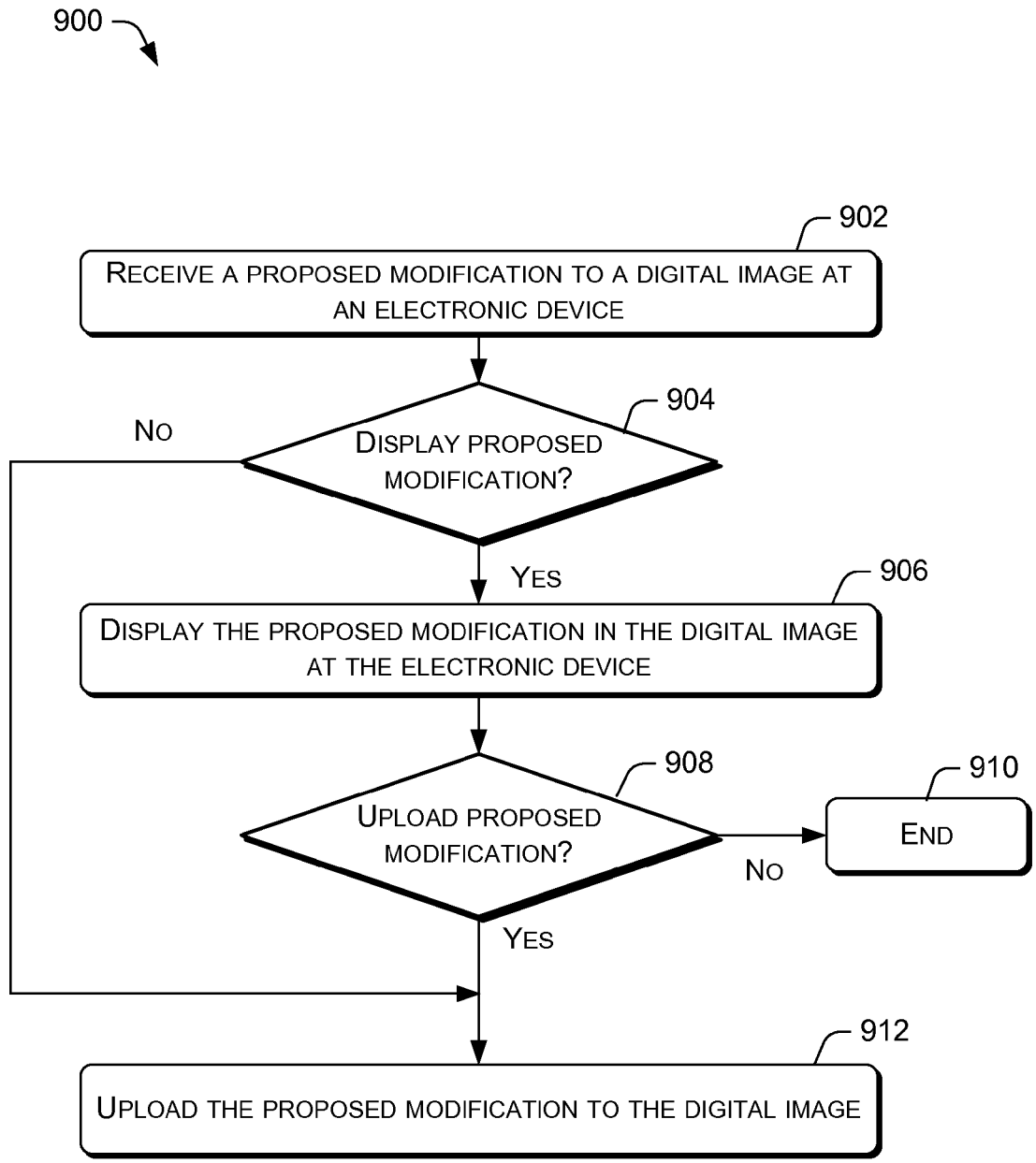
FIG. 9 is a flow diagram of an illustrative process for uploading document corrections for crowd source content editing.
Figure 10:
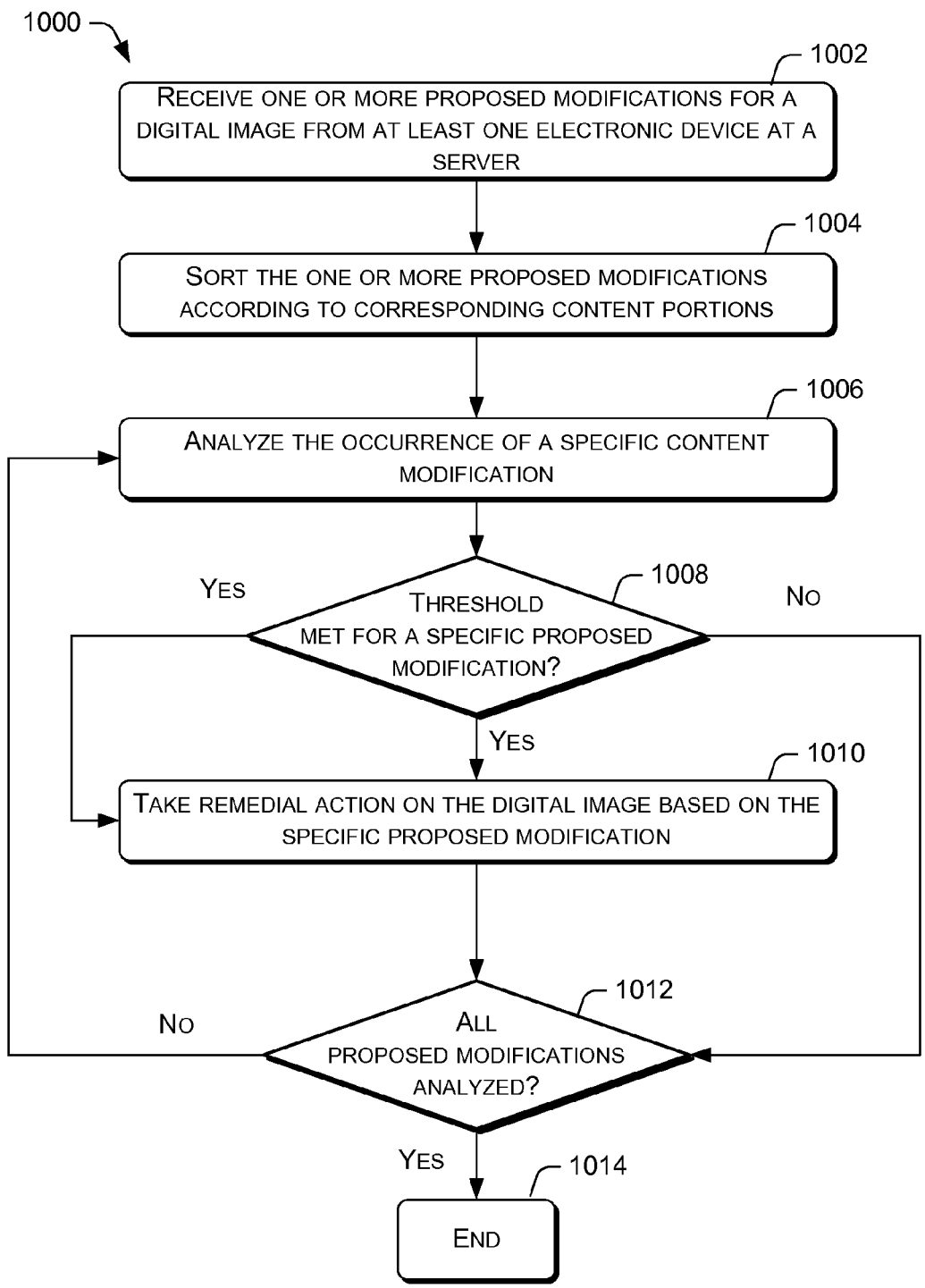
FIG. 10 is a flow diagram of an illustrative process for analyzing document corrections that are obtained via crowd source content editing.

FIG. 8 to FIG. 10 show illustrative processes 800-1000 for crowing source editing of digital images. Each of the processes 800-1000 is illustrated as a collection of steps in a logical flow graph, which represents a sequence of operations that can be implemented in hardware, software, or a combination thereof. In the context of software, the steps represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 800-1000 are described with reference to the environment 100 of FIG. 1.

FIG. 8 is a flow diagram of an illustrative process 800 for retrieving and displaying crowd source edited content. At 802, the electronic device 104 may receive a request to display at least one digital image via a data interface module 116 of the electronic device. The digital image may be part of a digital image collection 108. Accordingly, the device-based data interface module 116 may request the digital image from the server-based data distribution module 144. In various embodiments, the data interface module 116 may be configured to request an original version of the digital image or an up-to-date corrected version of the digital image.

At 804, it is determined whether a corrected version is available. In the FIG. 1 implementation, the data interface module 116 may be informed by the data distribution module 144 on the server 102 whether a corrected version of the digital image is available. Thus, if the data interface module 116 is informed that no corrected version is available ("no" at 804), the data interface module 116 of the electronic device 104 may retrieve an original version of the digital image from the server 102 at 810. However, if the data interface module 116 is informed by the data distribution module 144 that a corrected version is available ("yes" at 804), the data interface module may make another determination at 806 as to whether to request the corrected version.

If the data interface module 116 is configured to request a corrected version of the digital image ("yes" at 806), the data interface module 116 may retrieve a corrected version of the digital image from the data distribution module 144 of the server 102 at 808. In various embodiments, the corrected version of the digital image may include adopted corrections, and/or embedded modification metadata for proposed modifications that have not yet been implemented. The proposed modifications may be typographical modification and/or formatting modifications. However, if the data interface module 116 is configured to request an original version of the digital image ("no" at 806), the data interface module 116 may retrieve the original version of the digital image from the data distribution module 144 at 810.

Assuming the corrected version of the digital image is retrieved at 808, the content modification module 120 may further determine whether one or more modification indicators are to be displayed in the retrieved digital image, at 812. In various embodiments, the data analysis module 136 on the server 102 may cause the content modification module 120 to display modification indicator when a suggestion threshold is met for a content portion. However, the user may use the configuration menu 604 shown in FIG. 6 to deactivate this function.

Thus, if the user has deactivated this function, the content modification module 120 may determines that the one or more modification indicators is not to be displayed ("no" at 812), and trigger the user interface module 122 to display the digital image without modification indicators at 814. However, if the user has not deactivated the display of modification indicators, the content modification module 120 may determine that the modification indicators are to be displayed ("yes" at 812). Accordingly, the content modification module 120 may trigger the user interface module 122 to display the digital image with modification indicators for corresponding content portions at 816.

FIG. 9 is a flow diagram of an illustrative process 900 for uploading document corrections for crowd source content editing. The process 900 may occur after a user has downloaded one or more digital images of an image collection 108 for viewing at an electronic device 104, such as the eBook reader 104(N). The one or more digital images may be stored in the data cache module 124 of the electronic device 104.

At 902, the content modification module 120 of the electronic device 104 may receive a proposed change to a digital image. In various embodiments, the proposed change may be typographical modification and/or formatting modifications.

At 904, the content modification module 120 may determine, based on the user inputted setting at the configuration menu 604 shown in FIG. 6, whether the proposed modification made by the user is to be displayed in the digital image local to the electronic device 104. If the proposed modification is not to be displayed in the local digital image, ("no" at 904), the content modification module 120 may automatically upload the proposed modification of the digital image to the server 102 at 912.

However, if the proposed modifications are to be displayed ("yes" at 904), the content modification module 120 may display the proposed modifications in the digital image at the electronic device at 906. In various embodiments, the content modification module 120 may accomplish the display of the modification by changing the relevant content of the digital image.

At 908, the content modification module 120 may determine, based on the user inputted setting at the configuration menu 604, whether the proposed modification made by the user is to be uploaded to the server 102 to facilitate crowd source content editing. If the proposed modification is not to be uploaded ("no" at 908), the process 900 may terminate at 910. However, if the proposed modification is to be uploaded to the server 102 ("yes" at 908), the content modification module 120 may upload the proposed modification to the digital image at 912. In some embodiments, the content modification module 120 may upload the proposed modification at the time of the proposed modification is made. In other embodiments, the content modification module 120 may buffer the proposed modification in the data cache 124 until a predetermined number of proposed modifications accumulate prior to uploading them to the server 102. In still other embodiments, the content modification module 120 may upload the proposed modification according to a predetermined schedule (e.g., hourly, daily, weekly, etc.).

FIG. 10 is a flow diagram of an illustrative process 1000 for analyzing document corrections that are obtained via crowd source content editing. At 1002, the server 102 may use the data capture module 132 to receive one or more proposed modification to a digital image that originated from at least one electronic device 104 via the network 106.

At 1004, the sort module 134 on the server 102 may sort the one or more proposed modifications according to corresponding content portions. In various embodiments, the sort module 134 may parse the uploaded proposed modifications according to (1) digital image collection; (2) position of the modified content portion in the digital image collection (e.g., specific digital image in a digital image collection, position in the digital image); and/or (3) specific modification to the particular content portion. Additionally, the sort module 134 may keep a count of the times that each specific modification to a particular content portion in a digital image collection is uploaded. The sort module 134 may store such metadata on the specific content modifications in the data storage module 142.

At 1006, the data analysis module 136 may analyze the occurrence of a specific content modification, as facilitated by crowd source content editing. The occurrence may include the times that a particular modification request occurred. In at least one alternative implementation, the occurrence may include the number of identical content portion modification requests from different users who downloaded the digital image collection that contains the content portion. In other implementations, the occurrence may include the number of identical content portion modification requests from different users who downloaded and actually viewed the digital image collection that contains the content portion. For example, a specific content modification may be a change of the content portion "quitely", as illustrated in FIG. 2, to the modified form "quietly."

At 1008, the data analysis module 136 may determine whether a modification threshold is met for the specific proposed modification. This determination may be based, for example, on the analysis of the accounting. In various embodiments, the modification threshold may be based on a percentage of the total users who download the digital image collection that contains the modified content portion. Alternatively, the modification threshold may be based on a specific number of identical content portion modification requests from different users who downloaded the digital image collection that contains the content portion. However, in other embodiments where the data analysis module 136 has the ability to sense whether each user has actually viewed a digital image on an electronic device 104, the modification threshold may be based on a specific number of identical content portion modification requests from different users who downloaded and actually viewed the digital image collection that contains the content portion.

Thus, if the data analysis module 136 determines that the modification threshold is met for a particular content portion ("yes" at 1008), a remedial measure may be performed at 1010. In some embodiments, the data analysis module 136 may automatically adopt the proposed modification to the content portion as a bona fide correction. In other embodiments, the data analysis module 136 may pass the proposed modification to a report module 138, so that an administrator may decide whether to adopt the proposed modification as the bona fide correction. The adoption of the proposed modification to the content portion as a bona fide correction may lead to the generation of a modified version of the digital image that may be subsequently downloaded by other electronic devices 104. Moreover, in some embodiments, the modified version of the digital image may be further distributed via non-electronic channels. For example, a publisher or content provider of the digital image may convert the modified version of the digital image into printed paper copies by sending the modified version as print data to one or more printers. Further, the publisher or content provide may distribute the printed paper copies generated by the printers to various content users.

At 1012, the data analysis module 136 may determine whether all the proposed modifications are analyzed. If the data analysis module 136 determines that not all proposed modifications are analyzed ("no" at 1012), the process 1000 returns to analyze the occurrence for another specific content modification occurred at 1006. However, if the data analysis module 136 determines that all proposed modifications are analyzed ("yes" at 1012), the process 1000 may terminate at 1014.

Returning to 1008, if the data analysis module 136 determines that the modification threshold is not met for the particular content portion ("no" at 1008), the process 1000 may proceed directly to 1012.

The use of crowd source content editing leverages mass collaboration of a community of people, such as the content consumers of the digital image, to perform editing and proofreading tasks on the content of the digital image. In this way, self-publishing content providers may receive editing and proofreading services for their publicly available electronic content at little or no cost. Moreover, electronic content providers may receive corrective feedback regarding content that are transformed from printed form to electronic form, such as corrections to errors in the content that are introduced by the faults of optical recognition hardware and/or software, without expending considerable time and manpower. Furthermore, user experience with electronic content may be improved, as electronic content consumers may feel less frustration and greater satisfaction since they are able to contribute meaningfully to the refinement of electronic content, as well as mutually improve their content viewing experience.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
receiving, at an electronic device, a proposed modification for a content portion of a digital image;
submitting the proposed modification for the content portion to a server that determines whether a number of occurrences of the proposed modification for the content portion meets a modification threshold or a suggestion threshold that is lower than the modification threshold;
providing a modified digital image for display that includes the proposed modification for the content portion in response to the server determining that the number of occurrences meets the modification threshold; and
providing another modified digital image for display that includes the content portion and a modification indicator that shows a presence of embedded metadata for the content portion in response to the server determining that the number of occurrences meets the suggestion threshold, the embedded metadata including the proposed modification for the content portion.

2. The method of claim 1, wherein the embedded metadata further includes a percentage of total modification submissions from multiple users for the content portion that designated the proposed modification as a proper modification for the content portion.

3. The method of claim 1, wherein the receiving includes:
receiving a selection of the content portion and an error modification request for the content portion;
presenting a content modification interface that displays the content portion in response to receiving the error modification request; and
receiving the proposed modification for the content portion via the content modification interface.

4. The method of claim 3, wherein the error modification request includes a typographical error modification request or a format modification request.

5. The method of claim 1, wherein providing for display the modified digital image includes providing the modified digital image in response to the server determining that the number of occurrences of the proposed modification meets the modification threshold and in response to an administrator approving the proposed modification.

6. The method of claim 1, wherein the electronic device is an electronic book reader device.

7. The method of claim 1, wherein each of the modification threshold or the suggestion threshold is a predetermined number, a percentage of users that downloaded the digital image to a plurality of electronic devices, or a percentage of the users that downloaded and viewed the digital image on the plurality of electronic devices.

8. The method of claim 1, wherein the proposed modification is a spelling modification, a grammar modification, or a format modification of the content portion.

9. A computer readable medium storing computer-executable instructions that, when executed, cause one or more processors to perform acts comprising:
receiving a proposed modification to a content portion of a digital image;
submitting the proposed modification for the content portion to a server that determines whether a number of occurrences of the proposed modification for the content portion meets a modification threshold; and
providing a modified digital image for display that includes the proposed modification for the content portion in response to the server determining that the number of occurrences meets the modification threshold.

10. The computer readable medium of claim 9, wherein the server further determines whether the number of occurrences of the proposed modification for the content portion meets a suggestion threshold that is lower than the modification threshold, and wherein the acts further comprise providing another modified digital image for display that includes the content portion and a modification indicator that shows a presence of embedded metadata for the content portion in response to the server determining that the number of occurrences of the proposed modification meets the suggestion threshold, the embedded metadata including the proposed modification for the content portion.

11. The computer readable medium of claim 10, wherein the acts further comprise providing the embedded metadata for display in response to receiving a selection of the content portion in the modified digital image.

12. The computer readable medium of claim 10, wherein each of the modification threshold or the suggestion threshold is a predetermined number, a percentage of users that downloaded the digital image to a plurality of electronic devices, or a percentage of the users that downloaded and viewed the digital image on the plurality of electronic devices.

13. The computer readable medium of claim 10, wherein the embedded metadata further includes a percentage of total modification submissions from multiple users for the content portion that designated the proposed modification as a proper modification for the content portion.

14. The computer readable medium of claim 9, wherein the proposed modification is a spelling modification, a grammar modification, or a format modification of the content portion.

15. An electronic device comprising:
one or more processors; and
memory storing components executable by the one or more processors, the components comprising:
a content modification component that receives a proposed modification to a content portion of a digital image; and
a data interface component that submits the proposed modification for the content portion to a server that determines whether a number of occurrences of the proposed modification for the content portion meets a modification threshold,
wherein the content modification component generates a modified digital image that includes the proposed modification for the content portion when the server determines that the number of occurrences meets the modification threshold.

16. The electronic device of claim 15, further comprising a display component that provides the modified digital image for display.

17. The electronic device of claim 15, wherein the server further determines whether the number of occurrences of the proposed modification for the content portion meets a suggestion threshold that is lower than the modification threshold, and wherein the content modification component generates another modified digital image that includes the content portion and a modification indicator that shows a presence of embedded metadata for the content portion when the server determines that the number of occurrences meets the suggestion threshold, the embedded metadata including the proposed modification for the content portion.

18. The electronic device of claim 17, wherein the embedded metadata further includes a percentage of total modification submissions from multiple users for the content portion that designated the proposed modification as a proper modification for the content portion.

19. The electronic device of claim 15, wherein the content modification component receives the proposed modification by receiving an error modification request for the content portion, presenting a content modification interface that displays the content portion in response to the error modification request, and receiving the proposed modification for the content portion via the content modification interface.

20. The electronic device of claim 15, wherein the proposed modification is a spelling modification, a grammar modification, or a format modification of the content portion.

* * * * *

UNITED STATES PATENT AND TRADEMARK OFFICE
CERTIFICATE OF CORRECTION

| | | |
|---|---|---|
| PATENT NO. | : 8,553,930 B1 | Page 1 of 1 |
| APPLICATION NO. | : 13/652355 | |
| DATED | : October 8, 2013 | |
| INVENTOR(S) | : James David Meyers et al. | |

It is certified that error appears in the above-identified patent and that said Letters Patent is hereby corrected as shown below:

On the Title Page,

Column 1, Item 72, change "Inventor: James David Myers" to "Inventor: James David Meyers"

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,553,930 B1 |
| APPLICATION NO. | : 13/652355 |
| DATED | : October 8, 2013 |
| INVENTOR(S) | : James David Meyers et al. |

It is certified that error appears in the above-identified patent and that said Letters Patent is hereby corrected as shown below:

On the Title Page,

Item (12), delete "Myers" and insert -- Meyers --.

Column 1, Item 72, change "Inventor: James David Myers" to "Inventor: James David Meyers"

This certificate supersedes the Certificate of Correction issued April 29, 2014.

Signed and Sealed this
Twentieth Day of May, 2014

Michelle K. Lee
*Deputy Director of the United States Patent and Trademark Office*